(12) United States Patent
Gault

(10) Patent No.: US 6,303,891 B1
(45) Date of Patent: Oct. 16, 2001

(54) UNIVERSAL SHIELDING GAS FOR GMAW AND FCAW WELDING AND PROCESS

(75) Inventor: John T. Gault, Deer Park, TX (US)

(73) Assignee: Robert B. Taylor, Baytown, TX (US)

( * ) Notice: Subject to any disclaimer, the term of this patent is extended or adjusted under 35 U.S.C. 154(b) by 0 days.

(21) Appl. No.: 09/429,341

(22) Filed: Oct. 28, 1999

(51) Int. Cl.$^7$ ............................................. B23K 9/173
(52) U.S. Cl. ............................................. 219/74; 219/137 R
(58) Field of Search ........................... 219/74, 75, 137 R, 219/137 WM, 145, 22, 146.3; 228/219

(56) References Cited

U.S. PATENT DOCUMENTS

| 3,035,154 | * | 5/1962 | Wolff et al. | 219/74 |
| 3,139,506 | * | 6/1964 | Wolff et al. | 219/74 |
| 3,143,630 | * | 8/1964 | Robinson et al. | 219/74 |
| 3,504,160 | * | 3/1970 | Essers et al. | 219/146.3 |
| 4,463,243 | * | 7/1984 | Church | 219/74 |
| 4,529,863 | * | 7/1985 | Lebel | 219/74 |
| 4,572,942 | * | 2/1986 | Church . | |
| 4,626,646 | * | 12/1986 | Hilton | 219/74 |
| 4,645,903 | * | 2/1987 | Vito et al. | 219/74 |
| 4,866,246 | * | 9/1989 | Church | 219/74 |
| 5,192,851 | * | 3/1993 | James et al. | 219/145.22 |
| 5,210,388 | * | 5/1993 | Farwer | 219/74 |
| 5,227,609 | * | 7/1993 | Simon et al. | 219/137 R |

FOREIGN PATENT DOCUMENTS

| 769571 | * | 11/1971 | (BE) | 219/74 |
| 1358985 | | 7/1971 | (GB) . | |

* cited by examiner

Primary Examiner—Clifford C. Shaw
(74) Attorney, Agent, or Firm—Kenneth A. Roddy

(57) ABSTRACT

A universal shielding gas mixture contains, by volume, about 96.0% argon, 3.0% carbon dioxide, and 1.0% oxygen. This single shielding gas composition can be used for welding ferrous metals, including both carbon steel and stainless steel using a variety of gas metal arc welding (GMAW) processes including short circuit arc, pulse arc, spray arc, metal transfer modes and flux core metal arc welding (FCAW) when welding carbon steel, stainless steel, hardfacing and metal core wires. This universal shielding gas composition will not substantially alter the carbon content of the weld metal chemistry. In a second embodiment, suitable for use with carbon steel materials but not stainless steel, the shielding gas mixture contains, by volume, about 95.0% argon, 3.0% carbon dioxide, and 2.0% oxygen. Another aspect of the invention is a single tank containing the premixed universal shielding gas, and improved gas metal arc welding processes that utilize the disclosed shielding gas mixture.

1 Claim, 1 Drawing Sheet

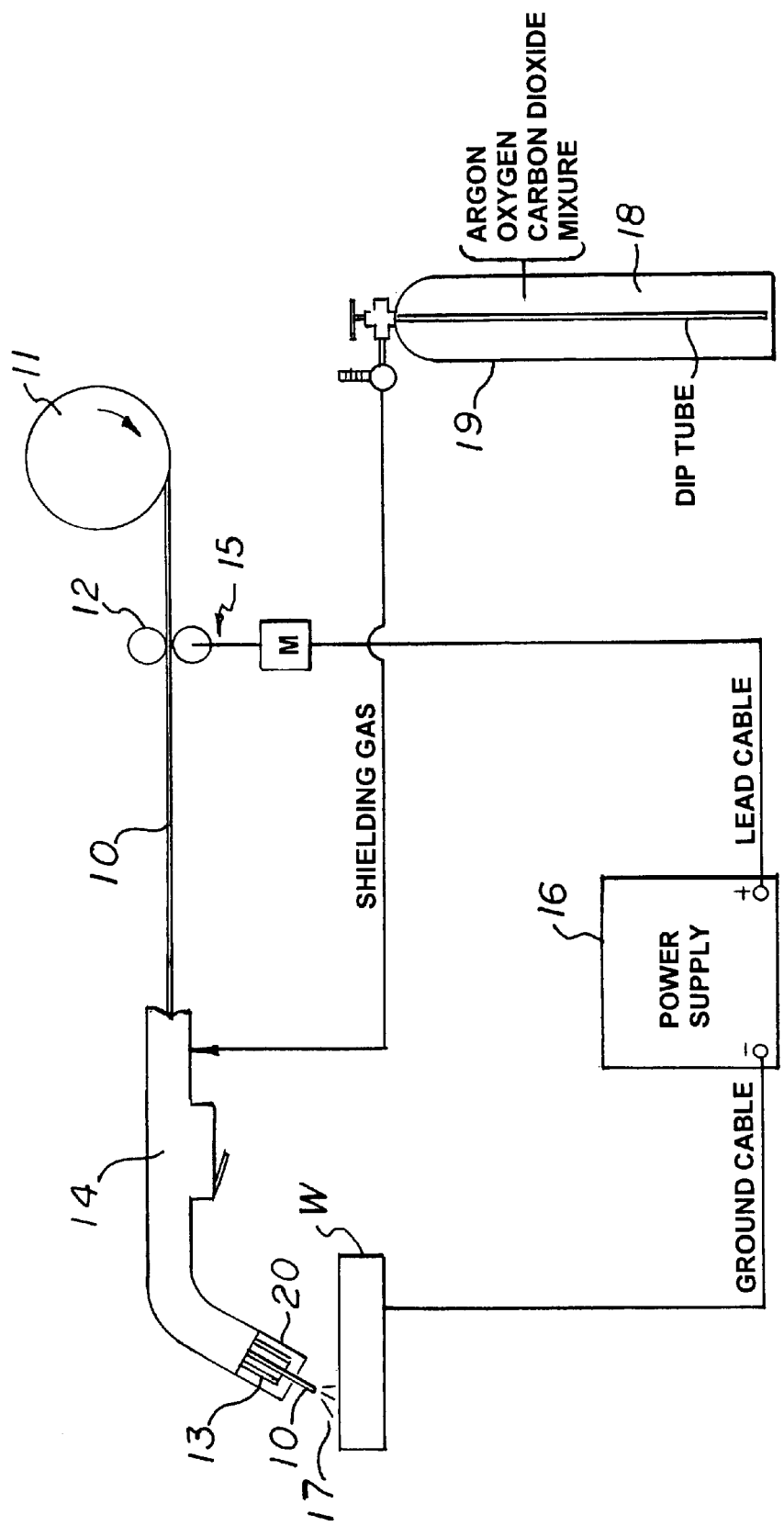

UNIVERSAL SHIELDING GAS FOR GMAW AND FCAW WELDING AND PROCESS

BACKGROUND OF THE INVENTION

1. Field of the Invention

This invention relates generally to gas shielded electric arc welding, and more particularly to a universal shielding gas composition for use in gas shielded gas metal arc welding (GMAW) and flux core arc welding (FCAW) processes and to an improved gas shielded metal arc welding process.

2. Brief Description of the Prior Art

In the Gas Metal Arc Welding (GMAW) process, heat for welding is produced by forming an arc between a continuous consumable wire electrode and the workpiece which melts the electrode to form the weld bead. The wire electrode is constantly driven through a welding gun and the weld pool or puddle is protected by an atmosphere of shielding gas, also delivered to the arc through the welding gun. The shielding gas shrouds the weld pool and is effective in preventing the pool and the subsequent weld from being oxidized or corroded by air or other ambients. A similar process, Flux Cored Arc Welding (FCAW) uses a wire with a central core of protective flux.

The manner, or mode, in which the metal transfers from the electrode to the weld pool largely determines the operating features of the process. There are three principal metal transfer modes; short circuiting, droplet or spray, and pulsed. Short-circuiting and pulsed metal transfer are used for low current operation while spray metal transfer is used with high welding currents.

In addition to general shielding of the arc and the weld pool, the shielding gas performs a number of important functions: forms the arc plasma, stabilizes the arc roots on the material surface, and ensures smooth transfer of molten droplets from the wire to the weld pool.

Each of the gases, and the relative ratio, in a shielded gas mixture also has a substantial effect on the welding operation. For example, argon affects the arc transfer, ionization potential, and arc plasma. Carbon dioxide affects penetration, allowable arc voltages and, depending upon the amount present, will determine the type of material on which the gas can be used and whether it can be short circuit, spray or pulse welded. oxygen affects thermal conductivity, heat transfer, weld puddle fluidity in short circuit welding, and wetting of the toe of the weld in spray and pulse arc welding. Helium has typically been used to affect heat input.

Thus, the shielding gas will have a substantial effect on the stability of the arc and metal transfer and the behavior of the weld pool, in particular, its penetration. Most shielding gases for GMAW welding are either mixtures of argon and oxygen or argon and carbon dioxide, and some gas mixtures may contain helium.

Table 1 below is a list of common shielding gases and their proportions, by volume, that are used for conventional GMAW welding processes:

TABLE 1

| WELDING PROCESS AND MATERIAL | Oxygen | Argon | Carbon dioxide | Helium |
|---|---|---|---|---|
| GMAW spray arc welding/stainless steel and carbon steel | 1%–2% | 98–99% | | |
| GMAW spray arc welding/stainless steel and carbon steel (Increased heat and oxidizing) | 5% | 95% | | |
| GMAW High-Speed spray arc welding/stainless steel and carbon steel | 8% | 92% | | |
| GMAW spray arc and pulse arc welding/carbon steel | | 80–85% | 15–20% | |
| GMAW short circuit and FCAW welding/carbon steel | | 75% | 25% | |
| GMAW short circuit welding/ stainless steel | | 8% | 2% | 90% |

Typical argon/oxygen mixtures previously used for GMAW spray arc welding on both carbon steel and stainless steel have contained, by volume, from 1% to 8% oxygen and from 92% to 99% argon, and no carbon dioxide. Typical argon/carbon dioxide mixtures previously use for GMAW spray arc and pulse arc welding on carbon steel have contained from 15% to 20% carbon dioxide and 80% to 85% argon, and no oxygen. Typical argon/carbon dioxide mixtures previously used for GMAW short circuit and FCAW (flux core) welding on carbon steel have contained 25% carbon dioxide and 75% argon, and no oxygen. The typical argon/carbon-dioxide/helium mixtures previously used for GMAW short circuit welding on stainless steel have contained 2% carbon dioxide, 8% argon, 90% helium, and no oxygen.

It can be seen that a different shielding gas composition having a critical ratio of gases is required for carbon steel and for stainless steel, and for each mode of metal transfer.

Some suppliers provide tanks or containers of shielding gases in the critical proportions as listed above, plus other mixtures, which requires the welder to have available, and often transport, a large number of heavy tanks in order to have the proper shielding gas for a welding operation. Prior to welding, the welder must determine what the proper mixture should be for the particular job at hand, and then obtain two or more tanks containing the gases, for example argon, oxygen and carbon dioxide, or select the tank containing the proper proportion of premixed gases.

Mixing of the shielding gases from the tanks is typically accomplished by a using a conventional gas mixer into which the two or more gases are fed from independent gas tanks. The welder must set the mixer and tank regulator to establish the gas mixture in the critical proportions, which is then fed to the gun or torch.

Poor gas shielding can result in porosity of the weld. Porosity is formed by entrapment of discrete pockets of gas in the solidifying weld pool. The gas may originate from the shielding gas, surface contaminants such as rust or grease, or insufficient deoxidants in the parent metal, electrode or filler wire.

The proportion of the gases contained in a shielding gas can also alter the chemical composition of the weld metal, which may lead to weld imperfections. For example, it has been found that changing the proportion of oxygen and carbon dioxide relative to the argon content by just 1.0% can cause the carbon dioxide to mix with the solidifying weld pool such that carbon content of the weld metal will be higher or lower than the base metal.

There are several patents which disclose various shielding gas mixtures that include oxygen, carbon dioxide, and argon (or an argon/helium mixture) in critical ratios.

Church, U.S. Pat. No. 4,463,243 discloses an electric arc welding gas system utilizing a welding gas comprising a mixture of from 40% to 70% argon, from 25% to 60% helium, from 3% to 10% carbon dioxide and from 0.10% to 1% oxygen and utilizing electrode currents in the range of 100 to 1100 amperes so as to form electrode metal globules of at least the size of the electrode diameter at the rate of 400 to 1200 globules per second.

Lebel, U.S. Pat. No. 4,529,863 discloses a metal-arc welding method that is particularly useful for out-of-position welding or vertical, inclined and overhead welds which utilizes a shielding gas formed of ratios of a minor proportion of a carbon dioxide and oxygen mixture combined with a major proportion of an argon and helium mixture. The approximate volumetric relationships of the gases are: carbon dioxide between about 2.5–8.5%, oxygen between about 0.1–0.8%, helium between about 25–60%, and argon the remainder, with the ratio between carbon dioxide and oxygen approximately 10:1 to about 20:1.

Church, U.S. Pat. No. 4,572,942, discloses a gas-metal-arc welding process utilizing a shielding gas mixture that produces a stable plasma formation. The gas is a mixture of major proportions of each of argon and helium and minor proportions of each of carbon dioxide and oxygen, which produces a stable, approximately dome-like plasma formation in the arc gap between the electrode melting end and the weld deposit. The gas comprises essentially between about 40–70% argon, between about 25–60% helium, between about 3–10% carbon dioxide and between about 0.1–2% oxygen.

Hilton, U.S. Pat. No. 4,626,646, discloses a shielding gas for electric arc welding which is a mixture, by volume, of 1.75% to 2.25% carbon dioxide and 0.25% to 1.0% oxygen with the remainder being helium and argon. Use of the gas enables slag-free welds that readily accept paint applied by an electrostatic deposition process.

De Vito, U.S. Pat. No. 4,645,903 discloses a gas metal arc welding process that extends the axial spray metal transfer range with a non-rotating arc from 10 to 25 lbs./hr using an electrode wire diameter between 0.035 to 0.052 inches. The process is carried out with a three-component shielding gas mixture consisting essentially of argon and oxygen in combination with carbon dioxide or carbon monoxide in a volume proportion of oxygen 1–2%, carbon dioxide 8–15%, and the balance argon. The arc voltage is maintained in a range of between 29 and 40 volts.

Church, U.S. Pat. No. 4,866,246 discloses a gas-metal-arc welding process, utilizing a four-gas mixture and relatively high voltage (above 42 volts). The shielding gas mixture is formed of major proportions of argon and helium and minor proportions of carbon dioxide and oxygen Farwer, U.S. Pat. No. 5,210,388 discloses an inert gas for TIG, MIG, MAG and plasma welding. Argon having a high degree of purity or else a mixture having a high degree of purity consisting of argon, helium, hydrogen, oxygen and/or carbon dioxide are used as the inert gas. The improvement is the addition of 80 ppm to 250 ppm of nitrogen to the gas whereby the inert gas consists solely of nitrogen and argon and hydrogen and/or carbon dioxide.

Table 2 below shows a comparison between the present shielding gas mixtures identified as "Mixture A" and "Mixture B"(described hereinafter) and the references discussed above which utilize a shielding gas mixture that includes oxygen, carbon dioxide, and argon.

TABLE 2

| | Oxygen | Carbon dioxide | Argon | Helium | Helium + Argon |
|---|---|---|---|---|---|
| 4,463,243 | 0.1–1.0% | 3.0–10% | 40.0–70.0% | 25–60% | |
| 4,529,863 | 0.1–0.8% | 2.5–8.5% | 30.7–72.4% | 25–60% | |
| 4,572,942 | 0.1–2.0% | 3.0–10.0% | 40.0–70.0% | 25–60% | |
| 4,626,646 | 0.25–1.0% | 1.75–2.25% | | | 96.7–98.0% |
| 4,645,903 | 1.0–2.0% | 8.0–15.0% | 83.0–91.0% | none | |
| Mixture A | 1.0% | 3.0% | 96.0% | none | |
| Mixture B | 2.0% | 3.0% | 95.0% | none | |

The references which disclose three gas or four gas mixtures that include, argon, carbon dioxide, and oxygen contain, by volume, oxygen within the range of from 0.25% to 2.0%, carbon dioxide within the range of from 1.75% to 10.0%, and argon within the range of from 30.7% to 91% (or a combination of argon and helium within the range of from 96.7 to 98%).

Although each of these argon/carbon dioxide/oxygen mixtures may be well suited for their particular purpose, none are suitable for use in welding both carbon steel and stainless steel nor capable of being used in all three metal transfer modes (short circuit, spray, and pulsed arc) of conventional GMAW welding processes and flux core metal transfer welding modes.

The present invention is distinguished over the prior art in general, and these patents in particular by a universal shielding gas mixture that contains, by volume, about 96.0% argon, 3.0% carbon dioxide, and 1.0% oxygen and which can be used for welding ferrous metals, including both carbon steel and stainless steel using a variety of gas metal arc welding (GMAW) processes including short circuit arc, pulse arc, spray arc, metal transfer modes and flux core metal arc welding (FCAW) when welding carbon steel, stainless steel, hardfacing and metal core wires. This universal shielding gas composition will not substantially alter the carbon content of the weld metal chemistry. In a second embodiment, suitable for use with carbon steel materials but not stainless steel, the shielding gas mixture contains, by volume, about 95.0% argon, 3.0% carbon dioxide, and 2.0% oxygen. Another aspect of the invention is a single tank containing the premixed universal shielding gas, and improved gas metal arc welding processes that utilize the disclosed shielding gas mixture.

SUMMARY OF THE INVENTION

It is therefore an object of the present invention to provide a universal shielding gas having a gas mixture suitable for use in gas metal arc welding (GMAW) processes when welding ferrous metals, including both mild steel and stainless steel, and also in flux core arc welding (FCAW) processes when welding carbon steel, stainless steel, hardfacing and metal core wires.

It is another object of this invention to provide a universal shielding gas for gas metal arc welding having a gas mixture suitable for use with short circuit arc, pulse arc, spray arc, and flux core metal transfer welding modes.

Another object of this invention is to provide a universal shielding gas for gas metal arc welding having a gas mixture in proportions that will not introduce carbon into the weld metal.

Another object of this invention is to provide a single tank containing a premixed universal shielding gas mixture for gas metal arc welding which will eliminate the guesswork involved in providing exactly the correct mixture for gas metal arc welding operations.

A further object of this invention is to provide a single tank containing a premixed universal shielding gas mixture which will eliminate the need to maintain, store and transport a large number of individual tanks for gas metal arc welding and flux core arc welding operations.

A still further object of this invention is to provide an improved gas metal arc welding process that utilizes a shielding gas mixture of argon, carbon dioxide and oxygen in critical proportions that will not alter the carbon content of the weld metal chemistry.

Other objects of the invention will become apparent from time to time throughout the specification and claims as hereinafter related.

The above noted objects and other objects of the invention are accomplished by a universal shielding gas mixture that contains, by volume, about 96.0% argon, 3.0% carbon dioxide, and 1.0% oxygen and which can be used for welding ferrous metals, including both carbon steel and stainless steel using a variety of gas metal arc welding (GMAW) processes including short circuit arc, pulse arc, spray arc, metal transfer modes and flux core metal arc welding (FCAW) when welding carbon steel, stainless steel, hardfacing and metal core wires. This universal shielding gas composition will not substantially alter the carbon content of the weld metal chemistry. In a second embodiment, suitable for use with carbon steel materials but not stainless steel, the shielding gas mixture contains, by volume, about 95.0% argon, 3.0% carbon dioxide, and 2.0% oxygen. Another aspect of the invention is a single tank containing the premixed universal shielding gas, and improved gas metal arc welding processes that utilize the disclosed shielding gas mixture.

BRIEF DESCRIPTION OF THE DRAWINGS

FIG. 1 is a schematic representation of a typical GMAW welding arrangement utilizing the universal shielding gas composition in accordance with the present invention.

DESCRIPTION OF THE PREFERRED EMBODIMENTS

In a preferred embodiment, the present shielding gas mixture contains, by volume, about 96.0% of argon, 3.0% of carbon dioxide, and 1.0% of oxygen. It has been found that this mixture in the recited proportions can be used effectively when welding ferrous metals, including both carbon steel and stainless steel using a variety of gas metal arc welding (GMAW) processes including short circuit arc, pulse arc, spray arc, metal transfer welding modes.

It has also been found that this same shielding gas mixture in the recited proportions can be used effectively in flux core arc welding (FCAW) processes when welding carbon steel, stainless steel, hardfacing and metal core wires.

Initial tests were carried out using test plates of 304 stainless steel base metal and 0.035" diameter wire electrodes of 308L stainless steel filler material which were welded by short circuit arc and by spray arc gas metal arc welding processes wherein the arc was shielded by the present universal shielding gas mixture of the proportions recited above.

Chemical analysis of the welds were conducted by an independent testing laboratory using ASTM E-1019 and ASTM E-1086 test methods and revealed the surprising result that the shielding gas mixture of argon, carbon dioxide and oxygen in the recited proportions did not alter the carbon content of the weld metal chemistry. That is to say, after welding, no carbon was added and none was taken away from the weld metal.

In a second preferred embodiment, the shielding gas mixture contains, by volume, about 95.0% of argon, 3.0% of carbon dioxide, and 2.0% of oxygen. This particular mixture is suitable for use with most carbon steel materials, but is not particularly suited for use with stainless steel.

It should also be pointed out that the embodiments described above, while suitable for carbon steel and stainless steel, are not suitable for use with non-ferrous metals such as aluminum, magnesium, etc., and TIG or heliarc welding processes.

The present shielding gas mixture is provided in a welding tank or cylinder which is equipped with a commercially available valve such as a CGA (compressed Gas Association) 580 valve. The tank or cylinder is provided with a dip tube that extends from the valve to the bottom of the tank. First the oxygen is pumped under pressure into the tank, then the carbon dioxide, followed by the argon. This produces a homogeneous mixture, and the dip tube assures that a 100% uniform mixture is withdrawn from the tank from a full to an empty tank condition.

Thus, the single tank containing the premixed universal shielding gas composition will eliminate the guesswork involved in providing exactly the correct mixture for gas metal arc welding operations, and will eliminate the need to maintain, store and transport a large number of individual tanks for gas metal arc welding and flux core arc welding operations.

FIG. 1 is a schematic representation of a typical GMAW welding arrangement utilizing the universal shielding gas composition. A consumable wire electrode 10, composed of any desired metal composition appropriate for the particular welding application, is drawn from a reel 11 by a feed roll 12 through a contact tube 13 in a conventional shielded arc torch or mixing gun 14. The gun 14 may be either manually operated or mechanized. The feed roll 12 is driven by a drive motor M contained in a conventional wire feeding unit 15 capable of feeding wire at the speeds necessary to achieve the desired deposition rates. A power supply 16 supplies power to both the wire feeding unit 15 and the torch or gun 14. The power supply 16 is of the constant potential or constant voltage type. The arc voltage is set to achieve a stable arc 17. The arc 17 is established between the consumable electrode 10 and the workpiece W by energizing the power supply 16 and feeding the electrode into direct contact with the workpiece.

The shielding gas 18 is fed into the torch or gun 14 from a single tank 19 containing the premixed argon, oxygen and carbon dioxide composition in the previously described critical proportions to pass through the space between the torch contact tube 13 and the torch nozzle 20 so that it forms a shroud for shielding the arc from ambient atmosphere.

The electrode 10 is fed through the contact tube 13 into the arc 17 formed between the electrode and workpiece W. The contact tube 13 is connected through the torch or gun 14 to the power supply 16 for supplying power to the electrode 10. The workpiece W is connected to ground in common with the power supply ground.

In one example using the present shielding gas and the GMAW short circuit arc metal transfer process to weld 304 stainless steel base metal, a 0.035" diameter solid wire electrode of 308L stainless steel is used as a filler material. The arc voltage is set a voltage between 15 to 36 volts and amperage between 115 to 250 amps. The wire electrode is fed to the weld at a rate sufficient to transfer filler metal to the weld pool.

In another example using the present shielding gas and the GMAW short circuit arc metal transfer process to weld the 304 stainless steel base metal, a 0.045" diameter solid wire electrode of 308L stainless steel is used as a filler material, and the arc voltage is set a voltage between 18 to 40 volts and amperage between 130 to 300 amps. The wire electrode is fed to the weld at a rate sufficient to transfer filler metal to the weld pool.

In still another example using the present shielding gas and the GMAW short circuit arc metal transfer process to weld the 304 stainless steel base metal, a 0.045" diameter flux core electrode of 308L stainless steel is used as a filler material, and the arc voltage is set a voltage between 22 to 40 volts and amperage between 190 to 350 amps. The flux core electrode is fed to the weld at a rate sufficient to transfer filler metal to the weld pool.

While this invention has been described fully and completely with special emphasis upon a preferred embodiment, it should be understood that within the scope of the appended claims the invention may be practiced otherwise than as specifically described herein.

What is claimed is:

1. A universal shielding gas mixture suitable for use in welding ferrous metals including both carbon steel and stainless steel in gas metal arc welding (GMAW) and flux core arc welding (FCAW) processes, consisting of, by volume:

3.0% carbon dioxide, 1.0% oxygen; and 96.0% argon; and said universal shielding gas characterized as not significantly altering the carbon content of the weld metal chemistry when welding either carbon steel or stainless steel.

* * * * *